(No Model.)

J. M. KENNEDY.
TROLLEY MECHANISM.

No. 557,827. Patented Apr. 7, 1896.

WITNESSES:
H. G. Dieterich
J. Edw. Luckett

INVENTOR
James M. Kennedy,
BY
O'Meara & Co.
ATTORNEYS

UNITED STATES PATENT OFFICE.

JAMES M. KENNEDY, OF HOLLIDAYSBURG, PENNSYLVANIA, ASSIGNOR OF SEVEN-EIGHTHS TO THOMAS F. JOHNSTON AND HENRY L. BUNKER, OF SAME PLACE, AND WILLIAM F. GABLE AND GALEN HEMPERLY, OF ALTOONA, PENNSYLVANIA.

TROLLEY MECHANISM.

SPECIFICATION forming part of Letters Patent No. 557,827, dated April 7, 1896.

Application filed November 23, 1895. Serial No. 569,913. (No model.)

*To all whom it may concern:*

Be it known that I, JAMES KENNEDY, residing at Hollidaysburg, in the county of Blair and State of Pennsylvania, have invented certain new and useful Improvements in Trolley Mechanism, of which the following is a specification.

My invention relates to an improved trolley mechanism for electrically-propelled cars; and such invention has for its object to provide a trolley and adjusting devices therefor of a simple and inexpensive nature which can be easily manipulated and which will effectively serve for their intended purposes.

My invention also has for its object to provide a trolley having adjusting means operated from the interior of the car, and so arranged that the condition of the trolley can be observed both night and day from the interior of the car.

With other minor objects in view, which will hereinafter appear, my invention consists in such peculiar combination and novel arrangement of parts as will be first described in detail and then be specifically pointed out in the appended claims, reference being had to the accompanying drawings, in which—

Figure 1:
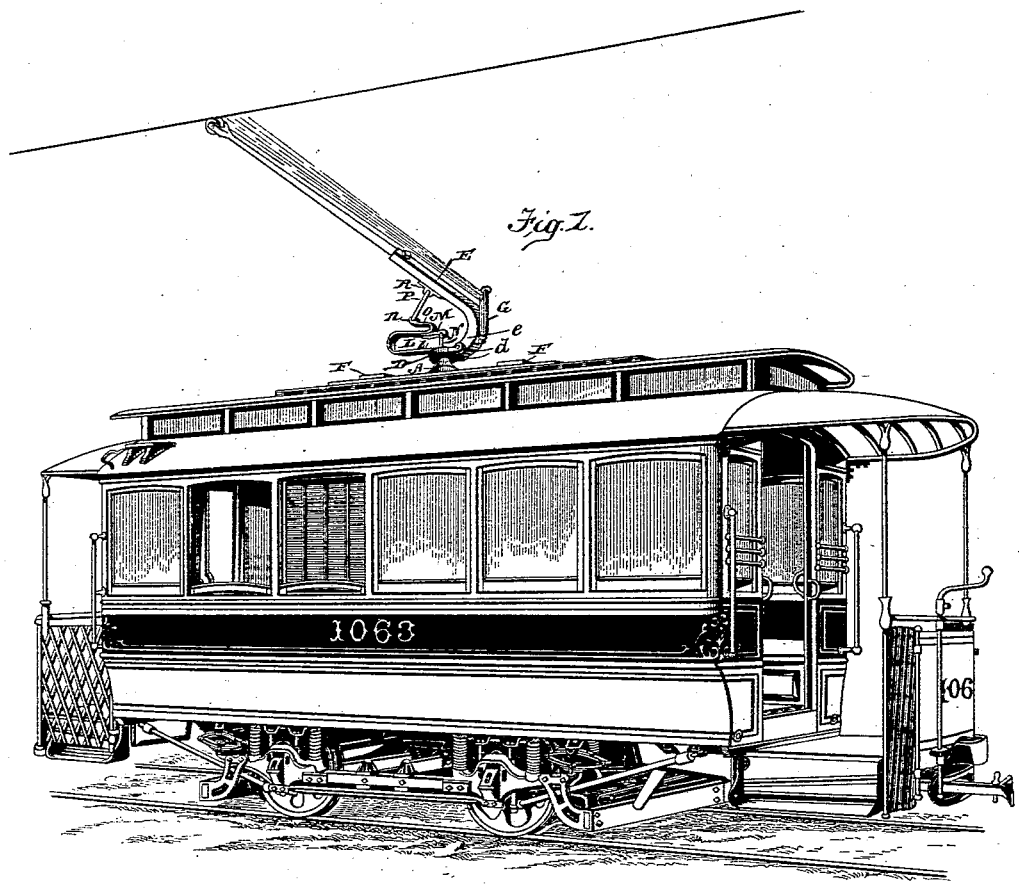
Figure 2:
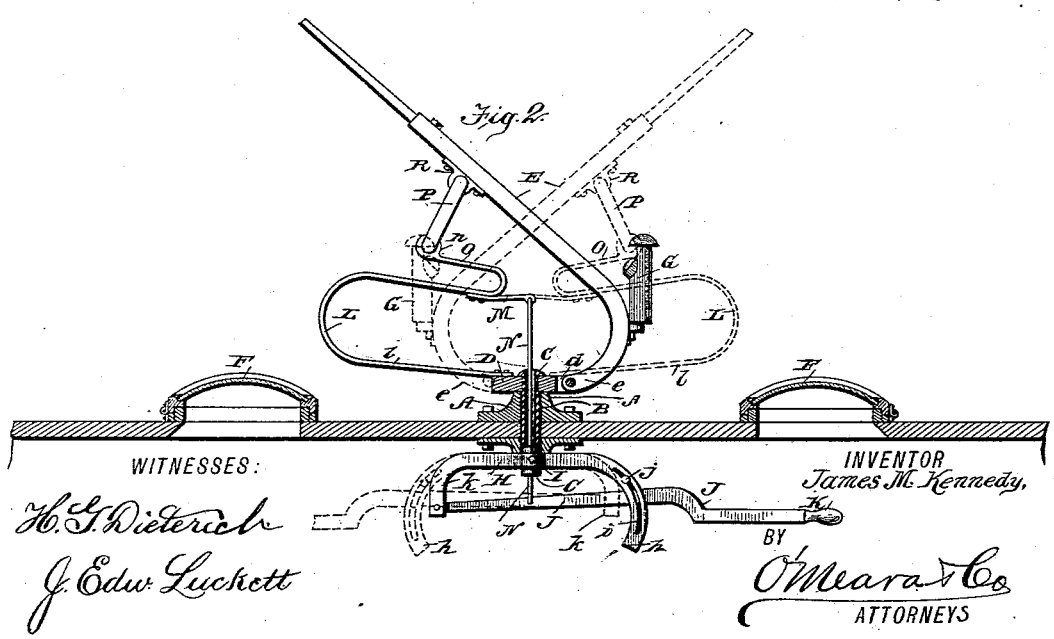

Figure 1 is a view of the street-car with my improved trolley mechanism applied; and Fig. 2 is a longitudinal section of the car-top, showing my improved trolley mechanism in an operative position.

In its practical arrangement my improved trolley mechanism is located centrally of the car-body and is adapted to be operated from the interior of the car, lookouts being provided in the top of the car through which the position of the trolley can be observed.

My improved mechanism comprises a hub or bearing-plate A, which is bolted to the top of the car centrally thereof and is centrally apertured at B to receive the tubular stem of the trolley-carrying arms, such stem (indicated by C in the drawings) forming a rotary axis for the trolley-arm, as most clearly shown in Fig. 2. To the stem C is fixedly held a bearing-plate D, to which, between the bifurcated end $d$, is pivotally secured the lower end of the trolley-arm proper, E, the said lower end being curved inward, as at $e$, so as to admit of the said arm being inclined when in engagement with the wire at an angle such as to bring the trolley in the line of sight as viewed from the lookouts F in the car-top, such curvature of the trolley-arm also providing a convenient attaching portion for a lantern G, having its bull-eye or light-throwing face so arranged as to cast a light on the trolley-wheel, such light device being provided to enable the conductor or motorman to see the position of the trolley-wheel at night when the trolley slips the wire.

By referring to Fig. 2 it will be noticed the stem C carries at the lower end an inverted yoke-like member H, which is made fast to the said stem by a set-screw I. The member H, it will be noticed, has at one end a curved portion $h$, having a slot $i$, in which is fitted an adjustable stop $j$, which may be in the nature of a set-screw, as shown, the purpose of which is to form a stop for the trolley-adjusting lever J, which is pivoted to the member $k$ of the yoke H and has its handle portion K projected beyond the curved end $h$, as shown.

L indicates an S-shaped flat spring, the lower portion $l$ of which is made much larger than the upper portion and has its bottom member secured to the plate D, while its upper member has an inwardly-projecting arm M, to which is secured the upper end of a flexible connection N, which passes down through the tubular stem C and connects with the lever J. The upper portion of the spring L has its member O terminate in an eye $n$, to which is pivotally connected the link P, the upper end of which is pivotally connected to an apertured bracket R on the lower face of the trolley-arm, as shown.

From the foregoing description, taken in connection with the accompanying drawings, it is thought that the operation and advantages of my improved mechanism will be readily understood. It will be observed that by providing the lookouts, arranged as shown, the condition of the trolley can at all times be ascertained from the interior of the car; furthermore, by supporting the trolley-holding devices in the manner shown the trolley can be quickly and positively adjusted from the side of the car; furthermore, by providing a spring arrangement, as described and shown, it is manifest that the link connection will allow the trolley-arm to have the necessary free-swing movement necessary to accommodate its traveling freely over the irregular trolley-wire. Again, the simplified arrangement of the trolley-spring, while providing all the spring-power necessary for the trolley-arm, allows for a quick and easy manipulation of the lever J when it it desired to adjust the trolley-arm.

Having thus described my invention, what I claim, and desire to secure by Letters Patent, is—

1. In a trolley mechanism, the combination with the turn-plate having a tubular stem projected into the car, a compressible spring secured to the turn-plate the trolley-arm pivotally secured to said plate, a link connection connected to the spring and the trolley-arm, and a pull device connected to the upper part of the spring projected through the tubular stem into the car, all arranged substantially as shown and described.

2. As an improvement in trolley mechanisms, the combination with the turn-plate and the stem D, C, the yoke member H, and trolley-arm J, pivotally secured to the plate D, at one side, of the spring L, secured at the lower end to the plate D, the link member P, and the flexible connection N, all arranged substantially as shown and for the purpose described.

3. The combination with the car having lookouts in the top, of a turn-table in the car-top centrally of the lookouts, said table having an operating-lever disposed within the car, the trolley-arm having an inwardly-curved member pivoted to the turn-table, a lantern held on such curved end with its light-throwing face directed toward the trolley, the spring L, connected to the turn-table, the link-arm P, connecting the trolley-arm and the spring, and the pull-rod N, passed down into the car and connected with the operating-lever, all arranged substantially as shown and described.

JAMES M. KENNEDY.

Witnesses:
E. H. FAULKENDER,
JOHN D. LOVE.